A. H. SIMMS.
Seed and Guano Distributer.

No. 169,199. Patented Oct. 26, 1875.

WITNESSES
Thomas Bernard
Francis J. Clasi

INVENTOR
Alonzo H. Simms
By Chipman Forsunt Co.
Attorneys

UNITED STATES PATENT OFFICE.

ALONZO H. SIMMS, OF NIXBURG, ALABAMA.

IMPROVEMENT IN SEED AND GUANO DISTRIBUTERS.

Specification forming part of Letters Patent No. 169,199, dated October 26, 1875; application filed August 21, 1875.

*To all whom it may concern:*

Be it known that I, ALONZO H. SIMMS, of Nixburg, in the county of Coosa and State of Alabama, have invented a new and valuable Improvement in Distributers; and I do hereby declare that the following is a full, clear, and exact description of the construction and operation of the same, reference being had to the annexed drawings, making a part of this specification, and to the letters and figures of reference marked thereon.

Figure 1:
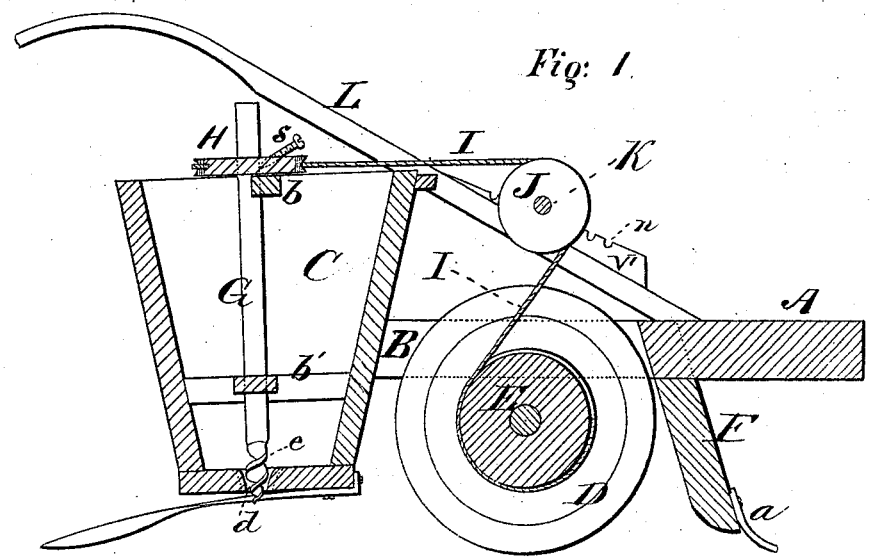
Figure 2:
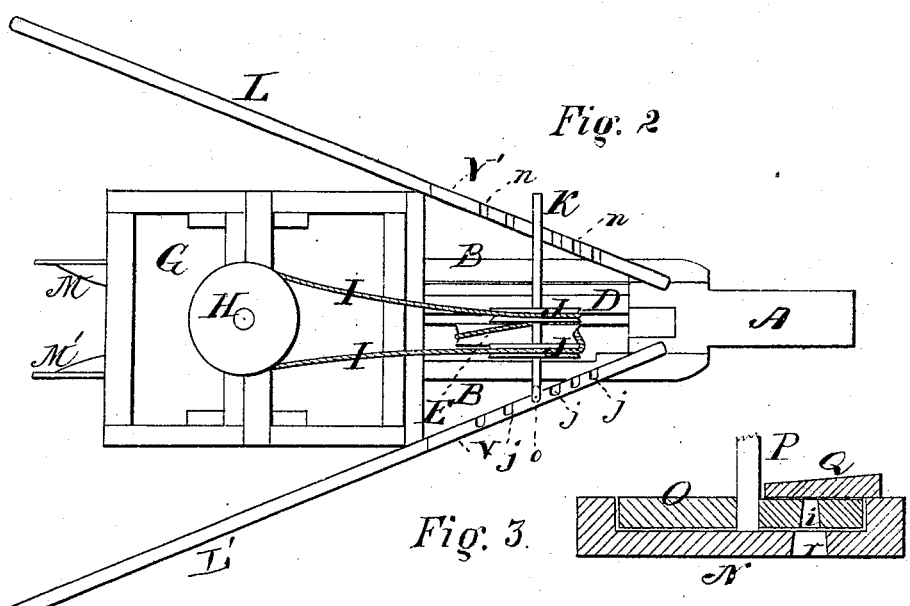
Figure 3:
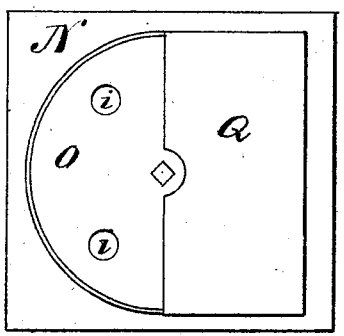
Figure 4:
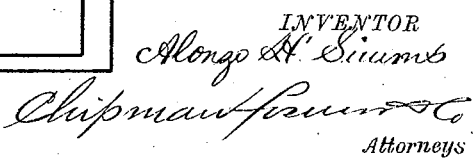

Figure 1 of the drawings is a representation of a longitudinal vertical section of my distributers, and Fig. 2 is a plan view of the same. Fig. 3 is a sectional detail view thereof, and Fig. 4 is a detail view.

This invention has relation to improvements in seed and fertilizer distributers, the object of which is to deliver the seed or fertilizer evenly in drills; and the nature of the invention consists in the novel construction and arrangement of the various devices used, whereby very useful results are obtained, as will be hereinafter more fully explained and claimed.

In the annexed drawings, the letter A represents the beam proper of my improved seed-distributer, to the rear end of which are rigidly secured two spaced side rails, B. The rear ends of these rails are rigidly secured to a tapering hopper, C, between which and beam A a wheel, D, is suitably mounted. This wheel is provided with a pulley-wheel, E, of less size, through the rotation of which motion is transmitted to the seed-dropper device, and the beam A has a standard, F, secured to it in front of the said wheel, bearing on its lower end a suitable shovel, $a$, which is capable of being vertically adjustable, for the purpose of increasing or diminishing the depth of the furrow. G represents an endwise-movable shaft arranged vertically in hopper C, and having its bearings in transverse beams $b\ b'$, arranged the one above the other in the said hopper. This shaft terminates in a tapering screw, $e$, and it passes through an opening, $d$, of corresponding shape, in the bottom of the hopper, of somewhat larger size, and it is provided with a horizontally-arranged pulley-wheel, H, which, when secured upon the said shaft by means of a clamp-screw, $s$, effectually holds the same against downward displacement, and thereby prevents it from protruding unduly through conical opening $d$ in the bottom of the hopper. A rapid rotary motion will be communicated to shaft G when the distributer is in use through the medium of an endless belt, I, which passes over pulley E on master-wheel D, thence upward each strand over an anti-friction pulley, J, rotating freely on a transverse shaft, K, mounted upon the guiding-handles L of the distributer to and around pulley H on the upper end of shaft G.

When the hopper is charged with seed or fertilizer, the rotary motion of the said shaft will carry it down through opening $d$ in the bottom of the hopper evenly and regularly, and in order to increase or diminish the flow, as may be necessary it is only requisite to loosen clamp-screw $s$, raise or lower shaft G, causing its lower end to increase or lessen the interval between it and the walls of the conical opening in the hopper, and, the desired adjustment being attained, again set up clamp-screw $s$. This effect of increasing or lessening the flow is due to the conical form, both of the screw on the end of the shaft and of the discharge-opening in the hopper.

Shaft K, upon which anti-friction wheels J rotate, is mounted in bearing-blocks V V', rigidly secured upon handles L, and it is made to do duty as a belt-tightener in the following manner, to wit: Block V is provided with a number of spaced perforations, $j$, and block V', with spaced notches $n$, whereby it is converted into a rack. Shaft J is provided on one end with a cylindrical arm at right angles to the length thereof, adapted to be received into perforations $j$ in block V, and its other end extends across block V', and is of a size to be received in notches $n$ of the said block. When from use the belt shall have become slackened, the cylindrical arm $o$ on the end of shaft K will be drawn out of a perforation, $j$, in block V, and inserted in the one next below. By then thrusting the free end of this shaft to the front, the belt I, being around the master and actuated pulleys, and over pulleys J, will be drawn taut and rendered operative, and this condition maintained by the engagement of the shaft in a notch, $n$. M M' represent coverers, which are secured one at each side to the bottom of the hopper, and extend a suitable distance to the rear. These coverers are made of spring-steel, of flat form and of suitable width, by bending the rectangular steel strip of which they are made so that a warped surface shall be formed, the plane of which will be vertical to the body of the strip. Being of spring-steel these coverers will pass easily over an elevation, or rise without raising the master-wheel off the ground.

To convert the machine above described into a mechanism for planting grain in hills, remove the bottom of the hopper and the rotating shaft G, and replace it by a supplementary bottom, N, having a cylindrical recess in its upper surface adapted to receive a perforated disk, O. This bottom has a vent, $r$, with which the perforations in the disk will successively register, when the latter is caused to rotate through the medium of a shaft, P, taking the place of shaft G, and rotated by the same mechanism. The excess of grain in the perforations $i$ in the disk will be swept off by a board, Q, which acts as a "strike," and confines the said disk in the recessed bottom N.

What I claim as new, and desire to secure by Letters Patent, is—

In a seed-distributer, the handles L L', having the perforated block V and the notched block V', in combination with the shaft K, having cylindrical spindle $o$, adapted to be received into block V, and anti-friction pulleys J J', substantially as specified.

In testimony that I claim the above I have hereunto subscribed my name in the presence of two witnesses.

ALONZO HENRY SIMMS.

Witnesses:
R. B. LITTLE,
J. W. HALL.